(12) United States Patent
Arkko et al.

(10) Patent No.: US 7,181,012 B2
(45) Date of Patent: Feb. 20, 2007

(54) SECURED MAP MESSAGES FOR TELECOMMUNICATIONS NETWORKS

(75) Inventors: Jari Arkko, Kauniainen (FI); Esa Turtiainen, Espoo (FI); Rolf Blom, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 598 days.

(21) Appl. No.: 09/948,101

(22) Filed: Sep. 7, 2001

(65) Prior Publication Data

US 2002/0052200 A1 May 2, 2002

Related U.S. Application Data

(60) Provisional application No. 60/231,581, filed on Sep. 11, 2000.

(51) Int. Cl.
- H04N 1/44 (2006.01)
- H04N 1/00 (2006.01)
- H04L 9/00 (2006.01)
- H04K 1/00 (2006.01)

(52) U.S. Cl. .................... 380/270; 380/246; 380/247; 713/169

(58) Field of Classification Search ................ 380/246, 380/270, 247; 713/169
See application file for complete search history.

(56) References Cited

U.S. PATENT DOCUMENTS

| | | | | |
|---|---|---|---|---|
| 5,864,667 | A | * | 1/1999 | Barkan ........................ 713/201 |
| 6,052,466 | A | * | 4/2000 | Wright ........................ 380/262 |
| 6,081,600 | A | * | 6/2000 | Blanchard et al. .......... 380/255 |
| 6,611,913 | B1 | * | 8/2003 | Carroll et al. .............. 713/171 |
| 2001/0009025 | A1 | | 7/2001 | Ahonen |

FOREIGN PATENT DOCUMENTS

| | | |
|---|---|---|
| WO | 01/91413 A | 11/2001 |
| WO | 02/07404 A | 1/2002 |

OTHER PUBLICATIONS

Antipolis, Sophia, "TSG-SA WG3 (Security) Meeting #6", TSGS-WG3#6(99)247, pp. 1-5. http://www.3gpp.org.*

3rd Generation Partnership Project, "Technical Specification Group Services and System Aspects; 3G Security; Security Architecture: 3G TS 33.102 version 3.1.0"), Jul. 1999, pp. 1-56.*

D. Harkins et al., "RFC 2409: The Internet Key Exhange (IKE)", Nov. 1998, the Internet Society.*

(Continued)

*Primary Examiner*—Christopher Revak
*Assistant Examiner*—Kaveh Abrishamkar
(74) *Attorney, Agent, or Firm*—Nixon & Vanderhye, P.C.

(57) ABSTRACT

An encrypted/authenticated mobile application part (MAP) protocol message is sent between a first network element (42A) of a first telecommunications network (40A) and a second network element (42B) of a second telecommunications network (40B). The first network element uses a master security association to derive a connection-specific security association, and includes in the encrypted/authenticated MAP message a parameter obtained from the connection-specific security association. Upon receipt at the second network element, the master security association is used to derive a connection-specific security association for use by the second network element. The second network element uses the connection-specific security association to decrypt/decode the MAP message.

30 Claims, 13 Drawing Sheets

OTHER PUBLICATIONS

Cheng, "Reuse of Security Associations for Improving Handover Performance", retrieved from Inspec, accession No. 6894144, The Institution of Electrical Engineers, Stevenage, GB, IEEE Proceedings of PIMRC'99, 10th Int'l. Symposium on Personal and Indoor Mobile Radio Communications, vol. 2, Sep. 12-15, 1999.

3GPP TS 33.200 V4.0.0 (Jun. 2001), 3rd Generation Partnership Project; Technical Specification Group Services and System Aspects; 3G Security; Network Domain Security; Map Application Layer Security (Release 4); Section 4-6, Annex A1.

Kent et al, "Security Architecture for the Internet Protocol", IETF, Network Working Group, Request for Comments, 2401, Nov. 1998, XP002902388, Retrieved from the Internet Mar. 18, 2002.

3G TS 33.102 V3.1.0 (Jul. 1997), 3rd Generation Partnership Project; Technical Specification Group Services and System Aspects; 3G Security; Security Architecture (3G TS 33.102 version 3.1.0).

* cited by examiner

FIG. 2  KEY ADMINISTRATION CENTER

FIG. 3 NETWORK ELEMENT

Quick Mode

SECURED MAP MESSAGES FOR TELECOMMUNICATIONS NETWORKS

This application claims the priority and benefit of U.S. Provisional Patent Application Ser. No. 60/231,581, filed Sep. 11, 2000, which is incorporated herein by reference in its entirety.

BACKGROUND

1. Field of the Invention

The present invention pertains to mobile telecommunications, and particularly to providing security for mobile telecommunications transmissions.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system. The Third Generation Partnership Project (3GPP) has undertaken to evolve further the UTRAN and GSM-based radio access network technologies.

In actuality, mobile telecommunications coverage for an area, e.g., a large region or country, may be provided by plural mobile telecommunication operators, each having their own radio access network with the nodes (e.g., network elements) including as those described above, for example. The plural mobile telecommunication operators (e.g., mobile telecommunications companies) must cooperate and communicate with one another to provide for their customers/subscriber services which span networks. For example, subscribers of a first network operated by one operator must be able to place/receive calls with subscribers of a second network maintained by a second operator. Moreover, the subscribers of the first network to be provided with coverage even when in the second network. Such communication and cooperation is effected, at least in part, by signaling between the network operators. Some of this signaling involves usage of the MAP (Mobile Application Part) protocol.

As the migration towards the third generation of mobile networks nears, the security of signaling traffic between the networks of different operators grows in importance. The third generation (3G) network signaling faces a diverse threat situation. The added computational power, the increasing number of operators on the market, and the new technologies available for potential intruders are all factors that contribute to the threat scene that the third generation signaling networks face.

What is needed, therefore, and an object of the present invention, is technique and/or method for securing the signaling traffic between network elements in different operators' networks, thereby preventing illegitimate uses of such information as the MAP (Mobile Application Part) protocol, for example.

BRIEF SUMMARY OF THE INVENTION

An encrypted/authenticated mobile application part (MAP) protocol message is sent between a first network element of a first telecommunications network and a second network element of a second telecommunications network. The first network element uses a master security association to derive a connection-specific security association, and includes in the encrypted/authenticated MAP message a parameter obtained from the connection-specific security association. Upon receipt at the second network element, the master security association is used to derive a connection-specific security association for use by the second network element. The second network element uses the connection-specific security association to decrypt/decode the MAP message.

The master security association is a set of security parameters that includes at least one of the following: (1) an authentication algorithm; (2) authentication keying material; (3) an encryption algorithm; (4) encryption keying material; and, (5) a lifetime value for the master security association. In one mode of the invention, the master security association is negotiated between a key administration center of the first telecommunications network and a key administration center of the second telecommunications network, preferably over an Internet Protocol network using an Internet Key Exchange Protocol (IKE). In the illustrated embodiment, the MAP message is sent over another network, e.g., a Signaling System No. 7 network.

In one embodiment of the invention, the first network element requests the master security association from the key administration center of the first telecommunications network and, if necessary, the second network element requests the master security association from the key administration center of the second telecommunications network. In an illustrated embodiment, at least one of these requests is performed utilizing an Internet Protocol.

The connection-specific security association is a set of security parameters that comprises security information that is required in order to extract protected information from the MAP message. In an illustrated embodiment, the parameter(s) included in the MAP message are a Security Parameters Index (SPI) and a network identifier, which are preferably included in a MAP Security Header. The Security Parameters Index (SPI) in conjunction with the sending network identifier (PLMNID) can be used to identify a master security association.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Architecture Overview

Figure 1:
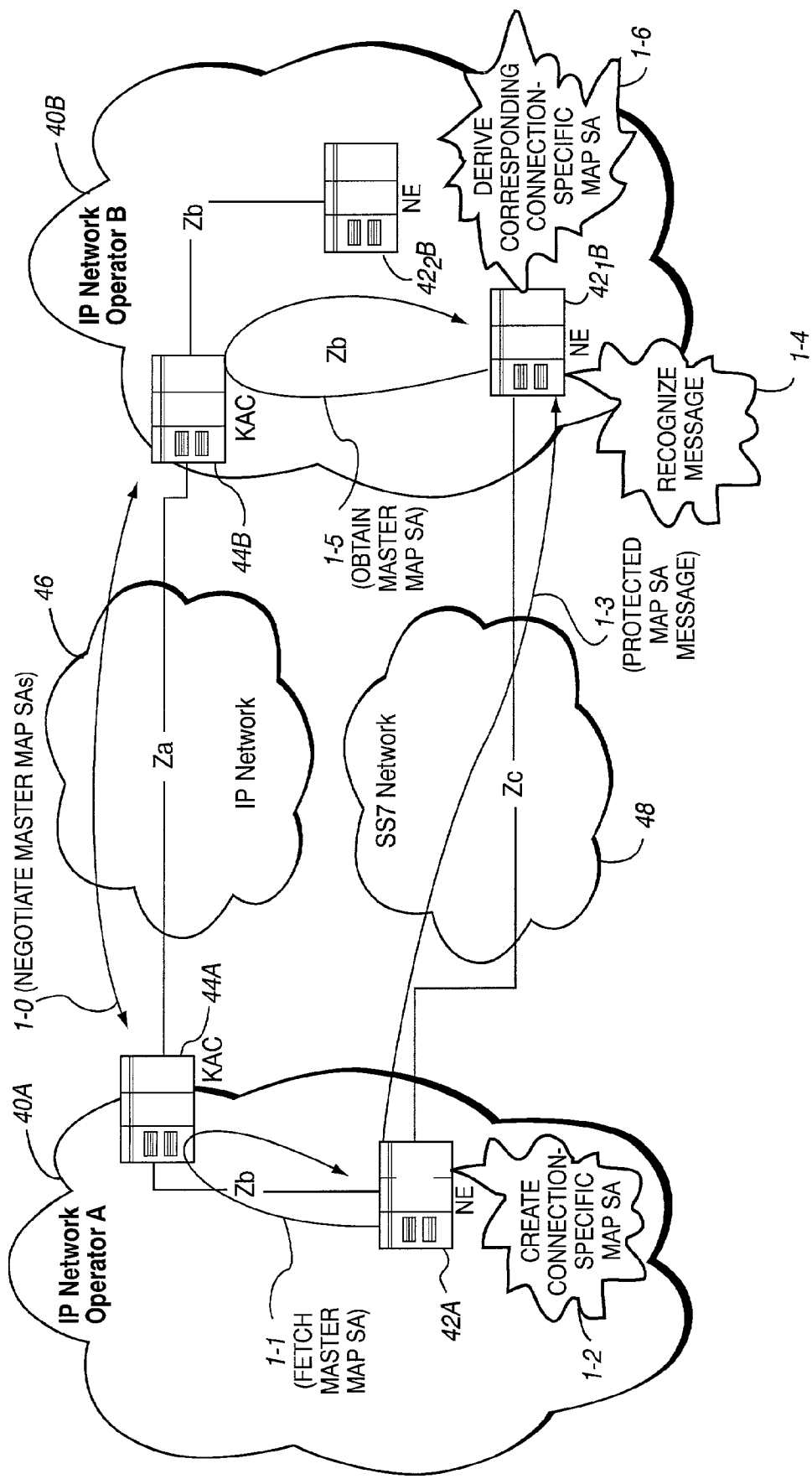
FIG. 1 is a schematic view of telecommunication networks which transmit secure MAP messages according to an example mode of the present invention.

In order to illustrate certain basic aspects of the present invention, FIG. 1 shows two example, representative telecommunication networks 40A and 40B. The two example telecommunication networks 40A and 40B can be (and likely are) maintained and operated by different network operators (e.g., different telecommunications companies). Each telecommunication network 40 is comprised of at least one (and likely) numerous network elements (NEs) 42, and further for the purposes of the present invention includes a functionality known as the key administration center (KAC) 44. Specifically, telecommunication network 40A has network element (NE) 42A and key administration center (KAC) 44A. Similarly, telecommunication network 40B has network elements (NE) $42_1$B and $42_2$B, as well as key administration center (KAC) 44B. With each telecommunication network 40, the key administration center (KAC) 44 communicates with the network elements (NEs) 42 of the network over an interface labeled as the Zb interface.

The key administration centers (KACs) 44 of the various telecommunication networks 40 perform certain communications as hereinafter described over a first network, such as IP Network 46. The interface over which the key administration centers (KACs) 44 communicate is referenced herein as the Za interface.

The network elements (NEs) 42 of the various telecommunication network 40 also communicate with one another, but over a second network such as (for example) the signaling system no. 7 (SS7) network 48. The interface over which the network elements (NEs) 42 of the various telecommunication network 40 communicate key is referenced herein as the Zc interface.

One aspect of the present invention particularly concerns a key management architecture, such as that shown in FIG. 1, that is used in a key exchange procedure to ensure secure transport of MAP (Mobile Application Part) messages. The key administration centers (KAC) 44 negotiate (e.g., over the Za interface) certain master MAP Security Associations (SAs). These master MAP Security Associations (SAs) are in turn used by network elements (NEs) 42 to create MAP-protecting security associations, also known as connection-specific MAP SAs. These MAP-protecting security associations or connection-specific MAP SAs are the actual MAP SAs that are used to protect the MAP signaling messages to and from other NEs in the same network or with NEs in another network.

MAP SAs, which include both master MAP SAs and connection-specific MAP SAs (used between NEs), are unidirectional so that separate security associations (Sas) are created for both directions of communication. A connection-specific MAP SAs is a unidirectional set of security parameters. A connection-specific MAP SA specifies the protection mode, it's parameters, and the cryptographic keys used in the communication between two nodes. A connection-specific MAP SA remains active until its lifetime (as defined by the master MAP SA expires).

A security association is identified by a Security Parameters Index (SPI) value together with the sending network's PLMNID. A Security Parameters Index (SPI) is an arbitrary 32-bit number that is assigned to a security association when the security association is created. An address for the destination network is thus a PLMNID, which consists of MCC and MNC.

Operational Overview

Describing certain operational aspects of the invention in brief, the key administration center (KAC) 44 of a network 40 negotiates a master MAP SA with each network specified by the network operator. Thus, although only two telecommunication networks 40 are illustrated in FIG. 1, it should be understood that likely each telecommunication network 40 will be connected via IP Network 46 with several other telecommunication networks 40, and therefore there will be several master MAP SAs (one for each network) in each key administration center (KAC) 44. These negotiated master MAP SAs are stored in at each key administration center (KAC) 44. In the illustrated embodiment, these negotiated master MAP SAs are stored in a database referenced herein as the KAC-$Z_c$-SADB database (Key Administration Center, Interface $Z_c$, Security Association Database). FIG. 1 shows, as action 1-0, the key administration center (KAC) 44A and the key administration center (KAC) 44B negotiating master MAP SAs.

When a network element (NE) wishes to communicate with another network element (NE), either in the home network or in a foreign operator's network, the network element (NE) first fetches a master MAP SA from the KAC-Zc-SADB database of its key administration center (KAC). FIG. 1 shows as action 1-1network element (NE) 42A fetching (requesting and receiving) a master MAP SA from key administration center (KAC) 44A. The network element (NE) then uses this master MAP SA to create a connection specific MAP SA. In this regard, action 1-2 shows network element (NE) 42A generation a connection specific MAP SA. This connection specific MAP SA is used to secure all MAP traffic between the communicating nodes. In particular, using the connection specific MAP SA, the sending network element (NE) [network element (NE) 42A] sends a protected MAP message to a responding network element (NE) [network element (NE) 42B], as depicted by action 1-3. The responding network element (NE) recognizes the protected message by a certain field included in the secured MAP message, in particular a security parameter index (SPI) described subsequently with respect to FIG. 5 (see action 1-4 in FIG. 1). Then, the responding network element (NE) obtains the corresponding master MAP SA from KAC-Zc-SADB database. In the FIG. 1 example, action 1-5 represents network element (NE) 42B obtaining the corresponding master MAP SA from KAC-Zc-SADB database of key administration center (KAC) 44B. The responding network element (NE) 42then uses the master MAP SA to derive the connection specific MAP SA (illustrated by action 1-6 in FIG. 1).

Key Administration Center (KAC)

Figure 2:
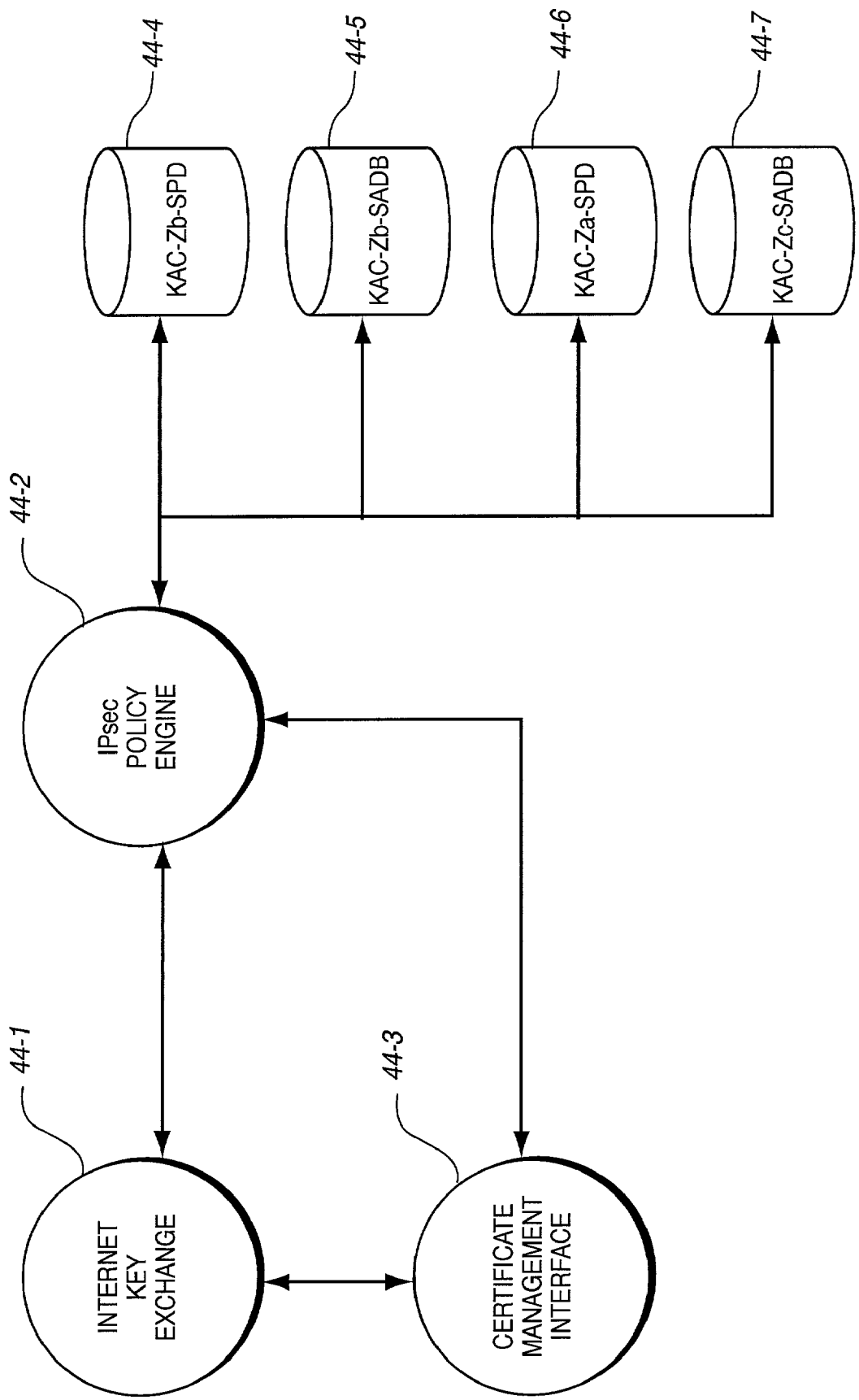
FIG. 2 is a diagrammatic representation of a portion of a key administration center (KAC) including in the telecommunication networks of FIG. 1.

As mentioned above, there is a key administration center (KAC) 44 in every network that supports the key management architecture of the present invention. As shown in FIG. 2, a key administration center (KAC) 44 includes a internet key exchange functionality 44-1; an IPsec policy engine 44-2; and a certificate management interface 44-3. In addition, the key administration center (KAC) 44 has the following databases: KAC-Zb-SPD database 44-4, KAC-Zb-SADB database 44-5, KAC-Za-SPD database 44-6, and KAC-$Z_C$-SADB database 44-7. Of these, KAC-Zb-SPD database 44-4 and KAC-Za-SPD database 44-6 are logically distinct databases which collectively form a security policy database (SPD). The security policy database (SPD) defines the data protection policy; the traffic to be allowed or denied; and, who is allowed to use network resources.

The IPsec policy engine 44-2 allows or disallows packets inbound or outbound according to currently loaded security policy as defined in IPsec policy engine 44-2 and certificate management interface 44-3. The certificate management interface 44-3 is used, e.g., to show that IKE/IPsec can be easily extended to support public key infrastructures (PKIs). X. 509 certificates are a scalable solution for verifying the identity of the other end of the transmission The key administration center (KAC) 44 performs various functionalities. For example, a key administration center (KAC) 44 performs the master MAP SA negotiation with key administration centers (KACs) 44 of different networks, as alluded to above with reference to action 1-0. Master MAP SA negotiation is done using IKE (Internet Key Exchange). A master MAP SA is negotiated on demand (i.e. when a network element (NE) 42 sends a request for a master MAP SA to the key administration center (KAC) 44). In addition, the key administration center (KAC) 44 maintains the KAC-$Z_C$-SADB database 44-7 that stores the negotiated Master MAP SAs. Further, the key administration center (KAC) 44 performs SA re-keying (the refreshing of master MAP SA) by maintaining a lifetime counter for each master MAP SA. After the master MAP SA has been negotiated, the internet key exchange functionality 44-1 of the key administration center (KAC) 44 returns the MAP SA to IPsec Policy Engine (IPE) 44-2, which stores the negotiated master MAP SA to KAC-$Z_C$-SADB database 44-7. Yet further, the key administration center (KAC) 44 provides the network elements (NEs) 42 with access to KAC-$Z_C$-SADB database 44-7 in order to fetch a valid master MAP SA for a communication. Moreover, the key administration center (KAC) 44 manages and maintains a secure IP connection from the key administration center (KAC) 44 to the network elements (NEs) 42 (over the Zb interface). The IPsec/IKE provides security for the Zb interface.

Network Element (NE)

Figure 3:
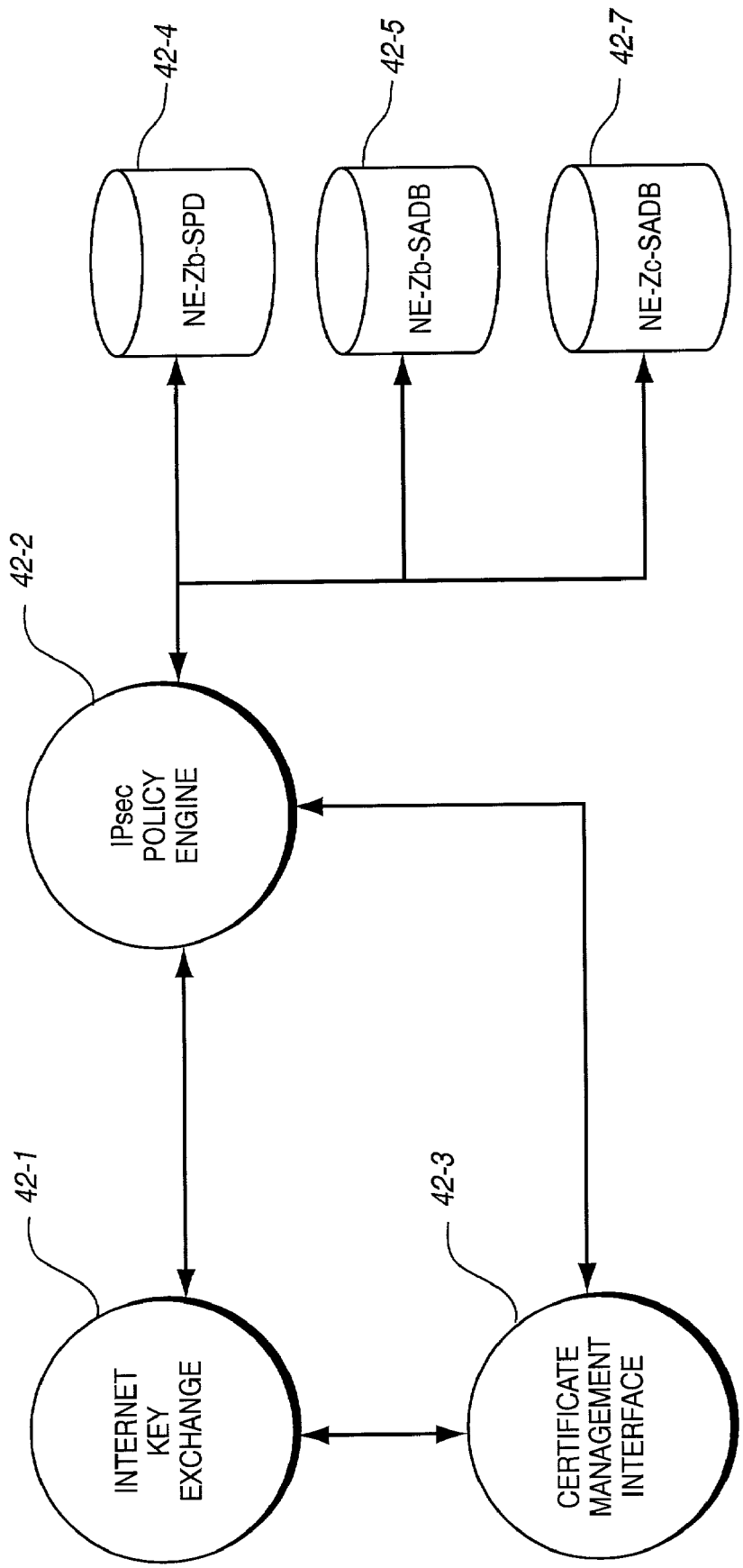
FIG. 3 is a diagrammatic representation of a portion of a network element (NE) including in the telecommunication networks of FIG. 1.

As illustrated in FIG. 3, the network elements (NE) 42 that support the key management architecture of the present invention includes an internet key exchange functionality 42-1; an IPsec policy engine 42-2; and a certificate management interface 42-3. In addition, the key administration center (KAC) 44 has the following databases: NE-Zb-SPD database 42-4, NE-Zb-SADB database 42-5, and NE-$Z_C$-SADB database 42-7.

The network element (NE) 42 performs various functionalities. For example, the network element (NE) 42 generates secure a MAP message as defined in the MAP SA (that is derived from the master MAP SA retrieved from KAC-$Z_C$-SADB database 44-7). The network element (NE) 42 maintains NE-$Z_C$-SADB database 42-7 to contain the valid MAP SAs that are derived from the master MAP SA retrieved from KAC-$Z_C$-SADB database 44-7. Moreover, the network element (NE) 42 NE maintains a lifetime timer for each MAP SA stored in NE-$Z_C$-SADB database 42-7. In this regard, the MAP SA lifetimes are defined by the master MAP SA received from the key administration center (KAC) 44. The network element (NE) 42 manages the expiry of MAP SAs as dictated by their lifetimes. Optionally, the network element (NE) 42 performs IKE negotiation and establishes protected IP connections (IPsec) with the home network key administration center (KAC) 44. On the responding end, a network element (NE) 42 calculates a connection specific MAP SA from the master MAP SAs (as alluded to with respect to action 1-6 in FIG. 1). Moreover, the network element (NE) 42 NE maintains a connection specific replay prevention counter for each NE-to-NE connection (over the Zc interface).

Interfaces

Figure 4:
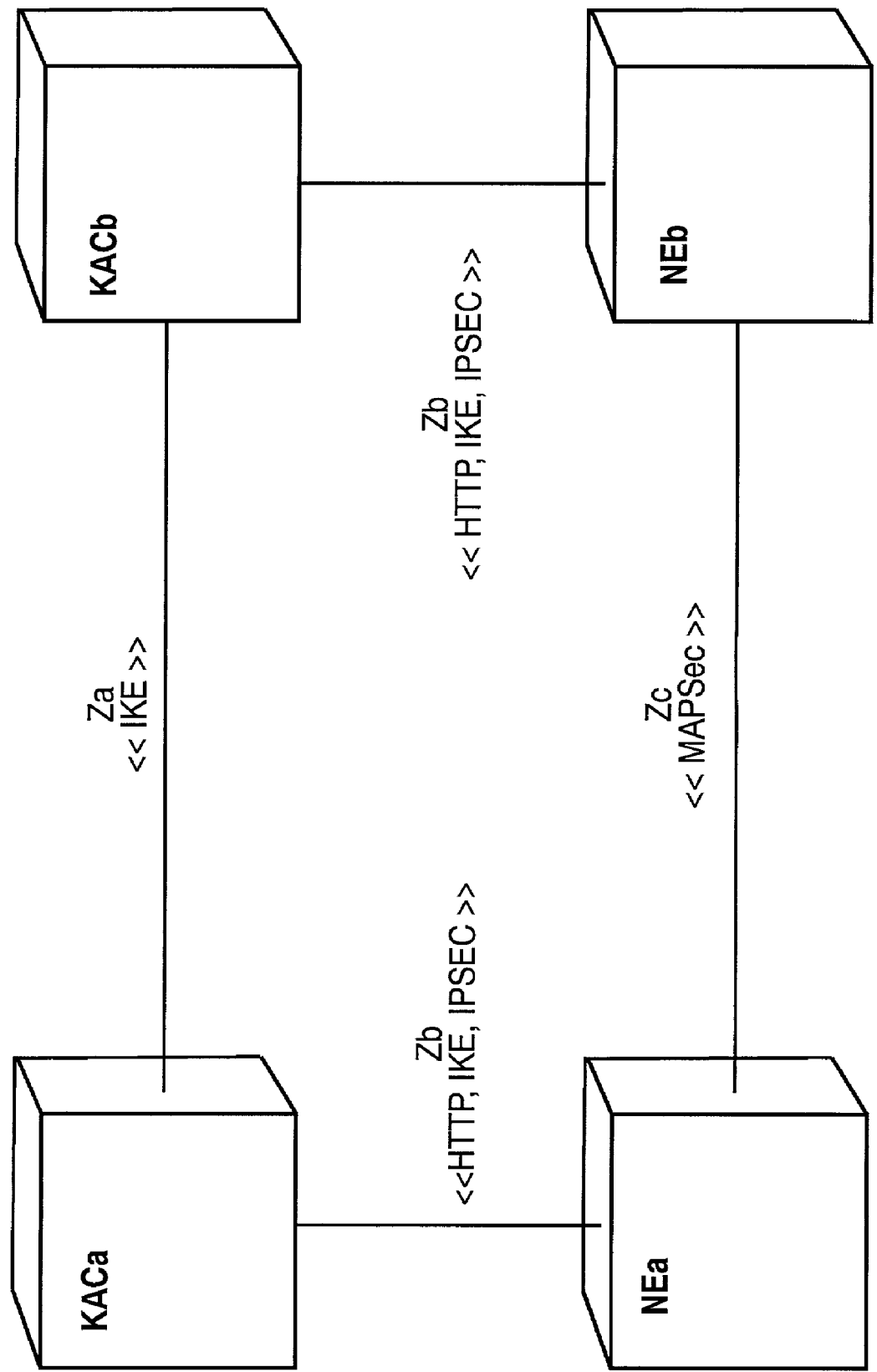
FIG. 4 is a diagrammatic view of certain interfaces involved for implementing the present invention in the telecommunication networks of FIG. 1.

FIG. 4 and Table 1 show in more detail aspects of certain interfaces involved in the present invention. The key management architecture for MAPSec defines three interfaces: Za, Zb and Zc.

Interface Za can be, for example, over an IP network (e.g., IP Network 46 in FIG. 1). The key administration centers (KACs) 44 in different networks use IKE over interface Za to negotiate the master MAP SAs. The master MAP SA IKE is negotiated under the MAPSec domain of interpretation (DoI) for ISAKMP, as described subsequently. The key administration centers (KACs) 44 can also perform IKE negotiations to create IPsec SAs under IPsec domain of interpretation for ISAKMP to protect other communications between key administration centers (KACs) 44 or between a key administration center (KAC) 44 and other network elements (NEs) 42.

Interface Zb can also be, by way of example, over an IP network. IKE, IPsec and HTTP are protocols used over the interface Zb. The key administration center (KAC) 44 and network elements (NEs) 42 perform master MAP SA delivery over the Zb interface. The network elements (NEs) 42 use HTTP to access the KAC-$Z_C$-SADB database 44-7 to obtain the master MAP SAs. This procedure must be protected with IPsec. Before a network element (NE) 42 accesses KAC-$Z_C$-SADB database 44-7, its internet key exchange functionality 42-1(IKE) negotiates IPsec SA for the connection. After this negotiation all HTTP operations are protected with IPsec according to the policy defined by the operator.

In the illustrated embodiment, interface Zc is over an SS7 (network 48 of FIG. 1 as an example second network). MAPSec is used to protect MAP messages (such as message 1-3) over the Zc interface. As reflected by action 1-6 in FIG. 1, the master MAP SA fetched over the interface Zb is be used to derive a connection specific MAP SA that defines the security parameters of the MAPSec traffic.

Map Security Header of Map Message

Figure 5:
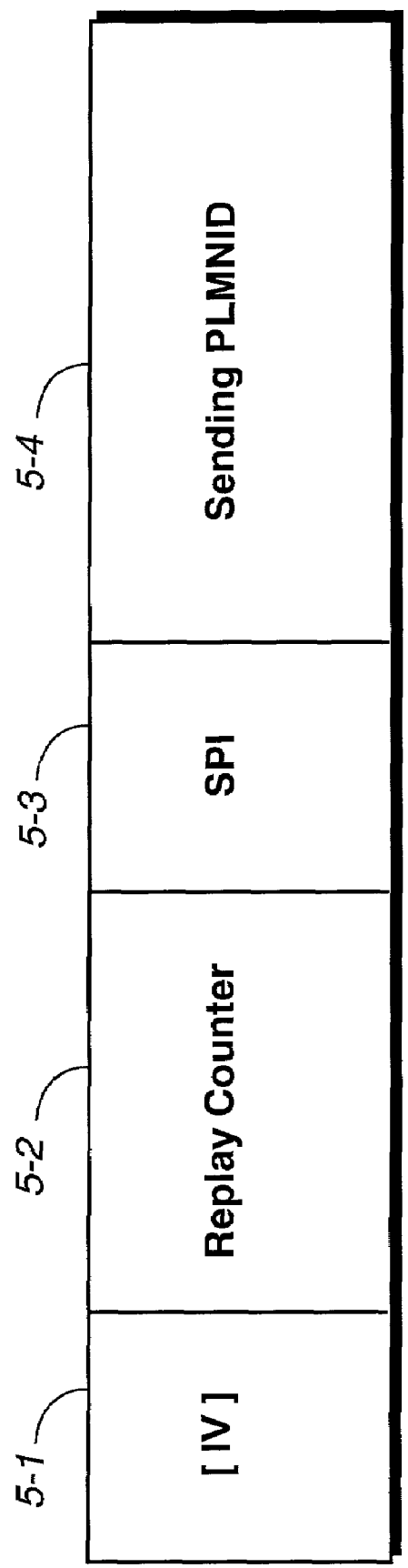
FIG. 5 is a diagrammatic view of a MAP Security Header utilized for a MAP message which implements an aspect of the present invention.

As indicated above, when a MAP message such as MAP message 1-3 of FIG. 1 is transmitted between two network elements (NEs) 42, in accordance with the present invention a MAP Security Header is added to secure or protect the MAP message. The MAP Security Header carries information that is required by a receiving entity in order to extract the protected information from a securely transported MAP message An example format of one embodiment of a MAP Security Header 50 is shown in FIG. 5. The MAP Security Header 50 includes the following fields or information elements: initialization vector (IV) 5-1; replay counter 5-2; security parameter index (SPI) 5-3; and, sending PLMNID 5-4. Each of these fields/information elements are discussed subsequently below.

The initialization vector (IV) 5-1 is used with block ciphers in a certain mode known as the chained mode to force an identical plaintext to encrypt to different cipher texts. Using initialization vectors (IVs) prevents launching a codebook attack against encrypted traffic. With stream cipher algorithms, an initialization vector (IV) is not used.

The replay counter 5-2 is used to prevent replay attacks against network elements (NEs) 42. The replay counter 5-2 is a 32 bits integer that is used for keeping track of the messages that have been passed between a single NE-NE pair. The replay counter 5-2 counter must be incremented every time either network element (NE) 42 sends a MAP message to a peer. The replay counter 5-2 is initialized to zero when a MAP SAs is created. A new MAP SA must be created prior to the replay counter 5-2 reaches 2Â32. Without replay counter 5-2, an attacker may resend any previously sent MAP message to the recipient network element (NE) 42. For example, an attacker could resend a Location Update message an hour after the original message was sent, causing erroneous location updates.

The security parameter index (SPI) 5-3 is an arbitrary value that is used in combination with sending PLMNID 5-4 to uniquely identify a master MAP SA. In one embodiment, the size of security parameter index (SPI) 5-3 is 32 bits. The security parameter index (SPI) 5-3 is used in the calculation of a value known as KEYMAT. The use of a security parameter index (SPI) 5-3 smaller than 32 bits decreases the randomness of KEYMAT. A 32 bit value of security parameter index (SPI) 5-3 enhances compatibility to other vendors' implementations.

The sending PLMNID 5-4 is the PLMNID for the sending network element (NE) 42. PLMNID is the ID number of the sending Public Land Mobile Network (PLMN). The value for the PLMNID is formed from the Mobile Country Code (MCC) and Mobile Network Code (MNC) of the destination network. For example: (MCC+MNC)=244+91 for the Sonera mobile network in Finland.

Key Negotiation

Figure 6:
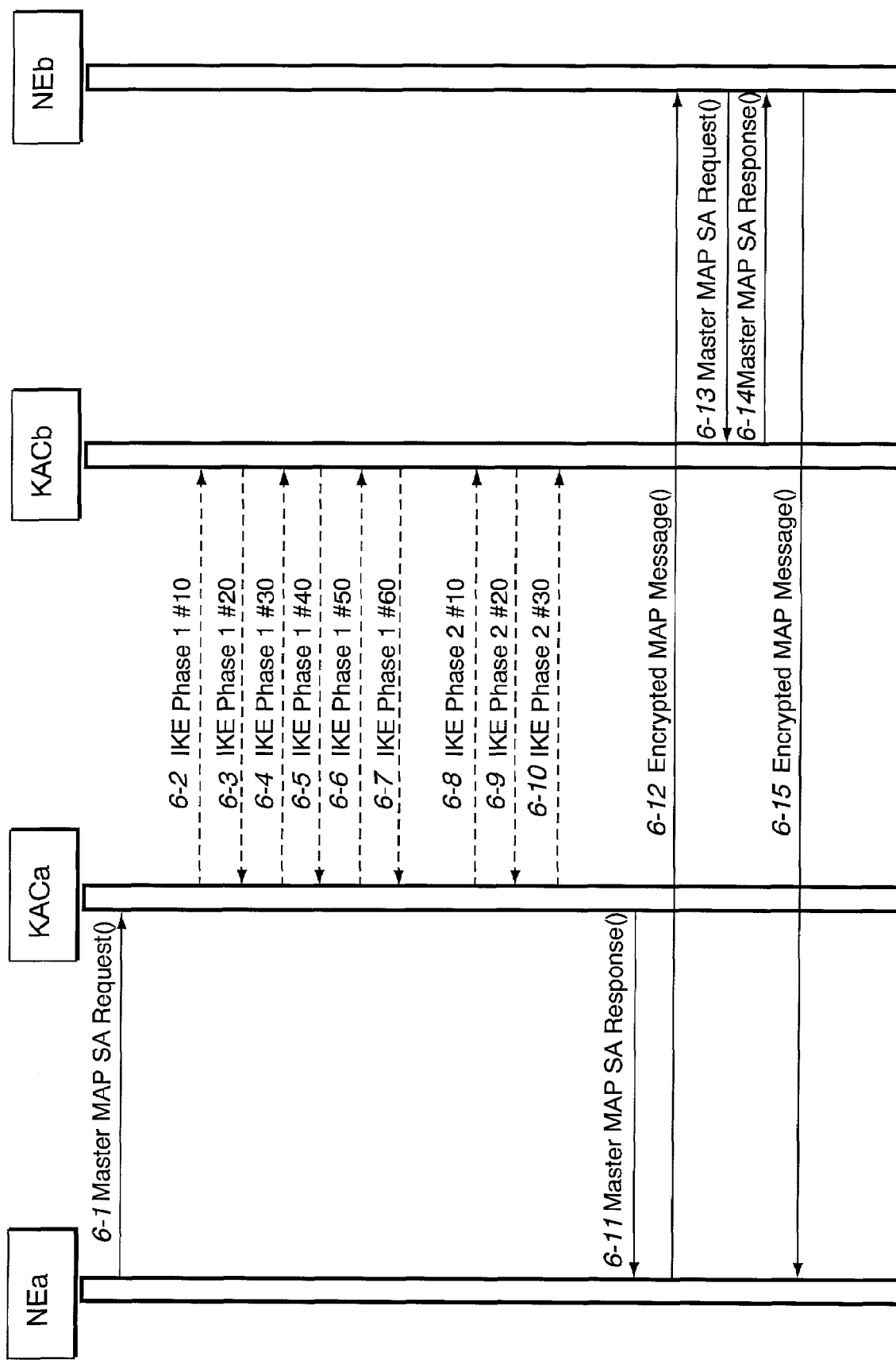
FIG. 6 is a flow diagram showing certain example actions involved in basic key negotiation between key administration centers of the telecommunication networks of FIG. 1 in accordance with a mode of the present invention.

FIG. 6 is a flow diagram showing, in more detail than FIG. 1, certain example steps involved in basic key negotiation between key administration centers of the telecommunication networks of FIG. 1 in accordance with a mode of the present invention. FIG. 6 also describes the MAPSec procedure, and illustrates a PULL procedure for obtaining a MAP SA for a network element.

At step 6-1, network element (NE) 42A requests a master MAP SA from key administration center (KAC) 44A to derive a MAP SA that defines security parameters for protected MAP traffic. Steps 6-2 through 6-7, and steps 6-8 through 6-10, are optional if a valid master MAP SA already exists in KAC-$Z_C$-SADB database 44-7, but are described below for completeness. Steps 6-2 through 6-7 involve IKE phase 1 negotiation. In particular, for step 6-2 ISAKMP (described in more detail infra) establishes a secure authenticated channel for further negotiation traffic and defines the security association to be used during the negotiations. Steps 6-8 through 6-10 involve IKE phase 2 negotiation, with IKE negotiates a master MAP SA between two networks.

Step 6-11 of FIG. 6 shows key administration center (KAC) 44A returning a valid master MAP SA in Master MAP SA Response message to network element (NE) 42A. Then, as step 6-12, network element (NE) 42A uses the received master MAP SA to derive the MAP SA, which defines the security parameters to be used for protecting MAP traffic over the Zc interface. After deriving the security parameters, network element (NE) 42A sends the encrypted (or authenticated MAP message depending on the MAP PP) to network element (NE) 42B. The encrypted MAP message includes PLMNID and SPI values in the respective security parameter index (SPI) 5-3 and sending PLMNID 5-4 fields of MAP Security Header 50.

As step 6-13, the responding network element (NE) 42B receives the encrypted MAP message. The MAPSec message is recognized, but no MAP SA exists in the NE-$Z_C$-SADB database 42-7 for network element (NE) 42B. Therefore, 42B sends a Master MAP SA Request to key administration center (KAC) 44B. The request includes the PLMNID and SPI acquired from the MAP Security Header 50 of the received MAP message.

At step 6-14 key administration center (KAC) 44B uses the received PLMNID and SPI values to index the master MAP SA in KAC-Zc-SADB database 44-7of key administration center (KAC) 44B (see FIG. 2). The master MAP SA is previously negotiated, so it is uniquely identified with PLMNID and SPI in KAC-Zc-SADB database 44-7.The key administration center (KAC) 44B then returns the master MAP SA to network element (NE) 42B with a Master MAP SA Response message.

As step 6-15, network element (NE) 42B derives the connection specific MAP SA from the master MAP SA acquired from key administration center (KAC) 44B. The received MAPSec message now can be processed and the response to the message can be generated according to the security parameters described in MAP SA.

Figure 10:
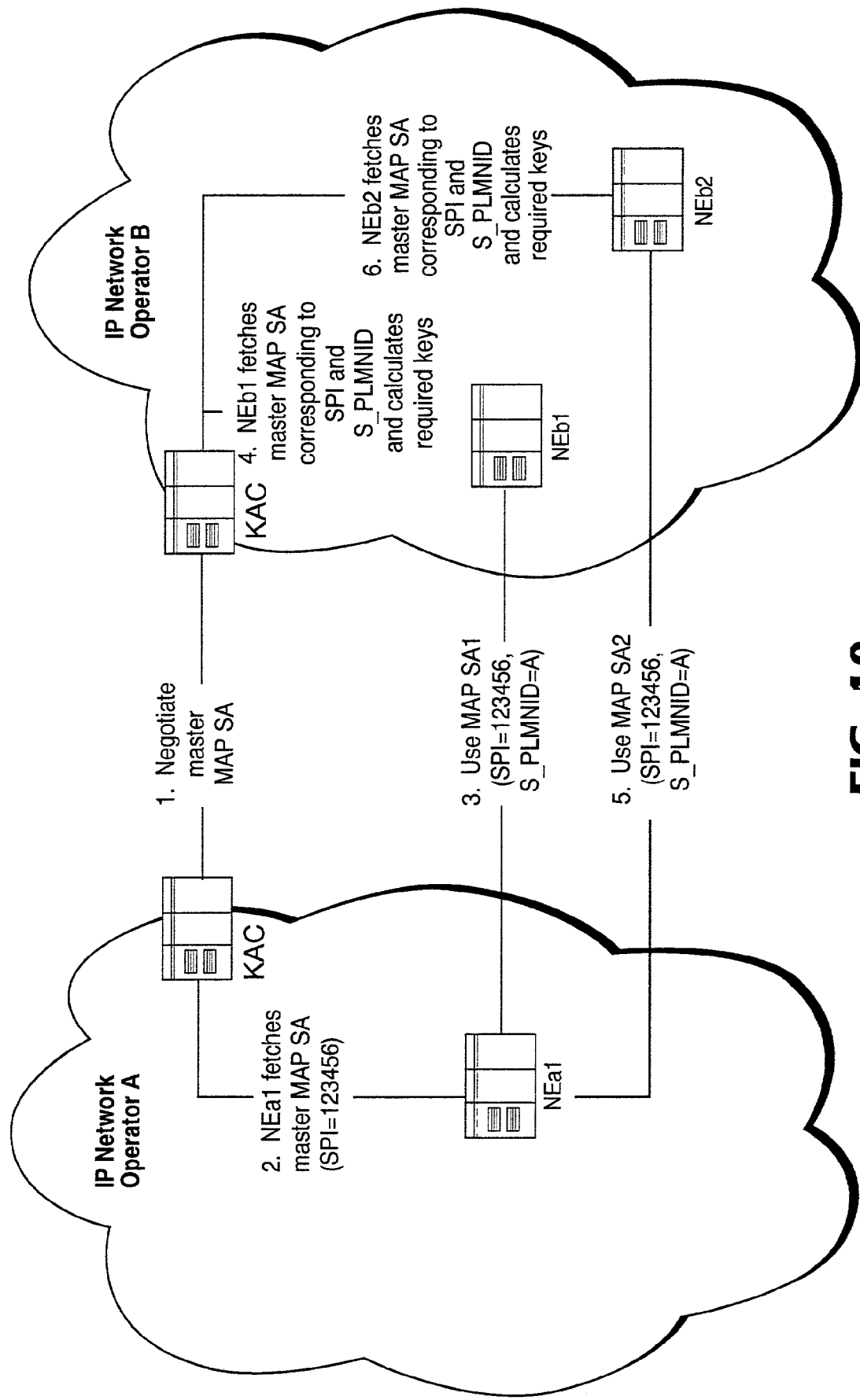
FIG. 10 diagrammatic view showing a procedure for deriving MAP SAs from a master MAP SA.

FIG. 10 shows a procedure for deriving MAP SAs from a master MAP SA.

Map Security Associations

MAP security associations (MAP SAs) are used to define the security parameters used to protect the traffic over the Zc interface (e.g., over the SS7 network 48 in FIG. 1).

The master MAP SA is a unidirectional set of security parameters (the concept is analogous to IPsec SA). Master MAP SAs are negotiated between two key administration centers (KACs) 44. A master MAP SA specifies the protection mode, it's parameters, and the cryptographic keying material used between two networks. The master MAP SA is created either during the start-up of the key administration center (KAC) 44 or after a network element (NE) 42 requests a master MAP SA for that network according to operator's policy.

Master MAP security association specifies the following parameters: Protection mode (e.g., No protection; Integrity and authentication; or Integrity, authentication and confidentiality); the authentication algorithm for integrity and authentication; the encryption algorithm for confidentiality; the encryption and authentication keying material; and the SA lifetime.

The master MAP SA lifetime should be selected according to various industry recommendations (e.g., recommendations of the IKE working group of IETF). The exact limit preferably depends on such factors as the chosen authentication or encryption algorithms.

It is currently preferred that the operation mode (e.g. ECB, CBC) be combined to algorithms and not defined as a separate parameter, thereby avoiding configuration problems among other things.

A connection specific MAP SA is a unidirectional set of security parameters. MAP SA is created between two network elements (NEs) 42. The connection specific MAP SA specifies the protection mode, it's parameters, and the cryptographic keys used between two hosts. A MAP security association is created when hosts communicate for the first time, and remains active until its lifetime expires. The MAP security association specifies the same parameters as the master MAP SA, with inclusion of the following distinctions (1) an encryption key generated from the master MAP SA keying material and from network element's SS7 identity of initiator and responder; and (2) an authentication algorithm key (integrity key) generated as encryption key.

It is currently preferred that the final key material be generated according to the following expression:

$F\_KEYMAT = PRF(SKEYID\_d,$
    $KEYMAT|LOCAL\_ID|REMOTE\_ID)$ wherein:

F_KEYMAT is the final keying material.

PRF is a pseudo-random function.

SKEYID_d is used to derive keying material for MAPSec. SKEYID_d is derived as described in RFC 2409 The Internet Key Exchange (IKE).

KEYMAT is the keying material from master MAP SA. KEYMAT is derived as described in RFC 2409 The Internet Key Exchange (IKE).

LOCAL_ID is the local SS7 identity of the initiating NE.

REMOTE_ID is the SS7 identity of the responding NE.

From the point of view of an IPsec implementation, a security association is a data structure that determines the transformation that is to be applied to an IP packet, and method of how it should be applied. The security association specifies the following parameters: (1) an authentication algorithm for AH and ESP protocols; (2) an encryption algorithm for ESP protocol; (3) encryption and authentication keys; (4) the lifetime of the security association in bytes; (4) the lifetime of the security association in seconds; and (5) a replay prevention counter sequence number.

Concerning differences between IPsec SAs and MAP SAs, a MAP SA does not have a limit on the amount of traffic after which the MAP SA expires. This is due to several peers using the same master MAP SA simultaneously. The fact that the master MAP SAs are shared by many network elements (NEs) 42 makes the counting of the amount of traffic an extremely complex and heavy operation.

The lifetime of encryption keys is not defined in MAP SA. The encryption keys are re-keyed every time the master MAP SA needs to be refreshed.

Trust Distribution for IKE

To guarantee the trust distribution for IKE, certificates can be used. Certificates provide authentication, integrity and confidentiality in the communication and are scalable solution to trust distribution.

Authentication and Encryption Algorithms

In one example embodiment, a single algorithm is used for authentication and a single algorithm is used for encryption. Usage of single algorithms for authentication and encryption tend to speed up standardization and simplify the implementation. Preferably, a Secure Hash Algorithm (SHA), version one, is used for authentication and a Twofish is used for encryption. The Secure Hash Algorithm (SHA), version one, was designed by NSA, and is part of the U.S. Digital Signature Standard. Twofish is a AES (Advanced Encryption Standard) candidate created by Bruce Schneier et al Internet Key Exchange Before a secure session begins, the communicating parties need to negotiate the terms for the communication. These terms are the ones that are defined in the security association (SA). In order to make the process feasible in a global network like the Internet, there needs to be an automated protocol for establishing the security associations. This automated protocol is the Internet Key Exchange Protocol (IKE), also known as ISAKMP/Oakley (Internet Security Association and Key Management Protocol combined with the Oakley key exchange).

The Internet Key Exchange (IKE) protocol is the standard protocol for negotiating the security mechanisms to be used between two hosts. It securely produces random short-term session keys for the hosts and authenticates the hosts either using shared secrets (passwords), or cryptographically using certificates. IKE combines the Internet Security Association and Key Management Protocol (ISAKMP) with the Oakley key exchange. ISAKMP is a framework for creating connection-specific parameters while Oakley is the actual instance of the ISAKMP framework for IPsec key and security association generation.

The Internet Key Exchange (IKE) key negotiation and exchange works in two phases. During the first phase, ISAKMP establishes a secure authenticated channel for further negotiation traffic and defines the security association to be used during the negotiations. During the second phase, it negotiates a security association to be used by IPsec. Although the first phase is time consuming, in the final result is time saving; after the first phase negotiations have been performed once, the more frequent second phase negotiations can then be performed faster.

The first phase security association can be established using one of two available modes: Main Mode (illustrated in FIG. 7A) and Aggressive Mode (illustrated in FIG. 7B). The Aggressive Mode is a little faster, but typically it does not protect the identities of the negotiating nodes.

The second phase can be established using Quick Mode (illustrated in FIG. 8A), as the initial negotiations have already taken place. In addition, New Group Mode (illustrated in FIG. 8B)can be used to negotiate a new group (MODP or elliptic curve) that is used to perform a Diffie-Hellman exchange.

Figure 7A:
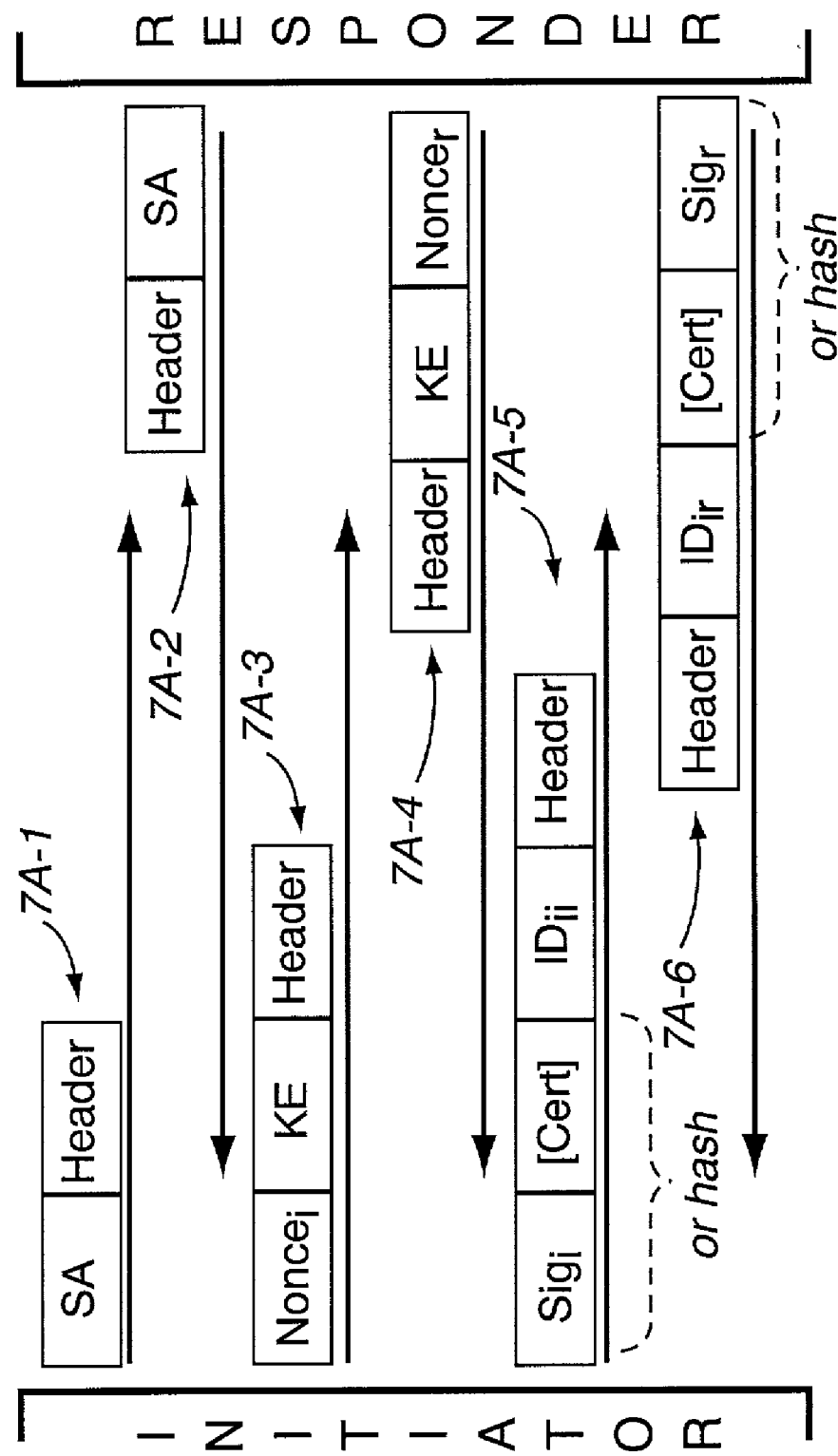
FIG. 7A and FIG. 7B are diagrammatic views respectively showing a main mode and an aggressive mode of first phase security association.

In the Main Mode illustrated in FIG. 7A, the negotiating parties use the first two messages 7A-1 and 7A-2 to negotiate the security policy for the exchange. They then use the next two messages 7A-3 and 7A-4 to perform a Diffie-Hellman key exchange and pass nonces to each other. The last two messages 7A-5 and 7A-6 are used to authenticate the parties using signatures or hashes and optional certificates. The Diffie-Hellman key exchange algorithm allows two parties to agree on a shared value without requiring encryption. The shared value is immediately available for use in encrypting subsequent conversations such as a data transmission or authentication.

Figure 7B:
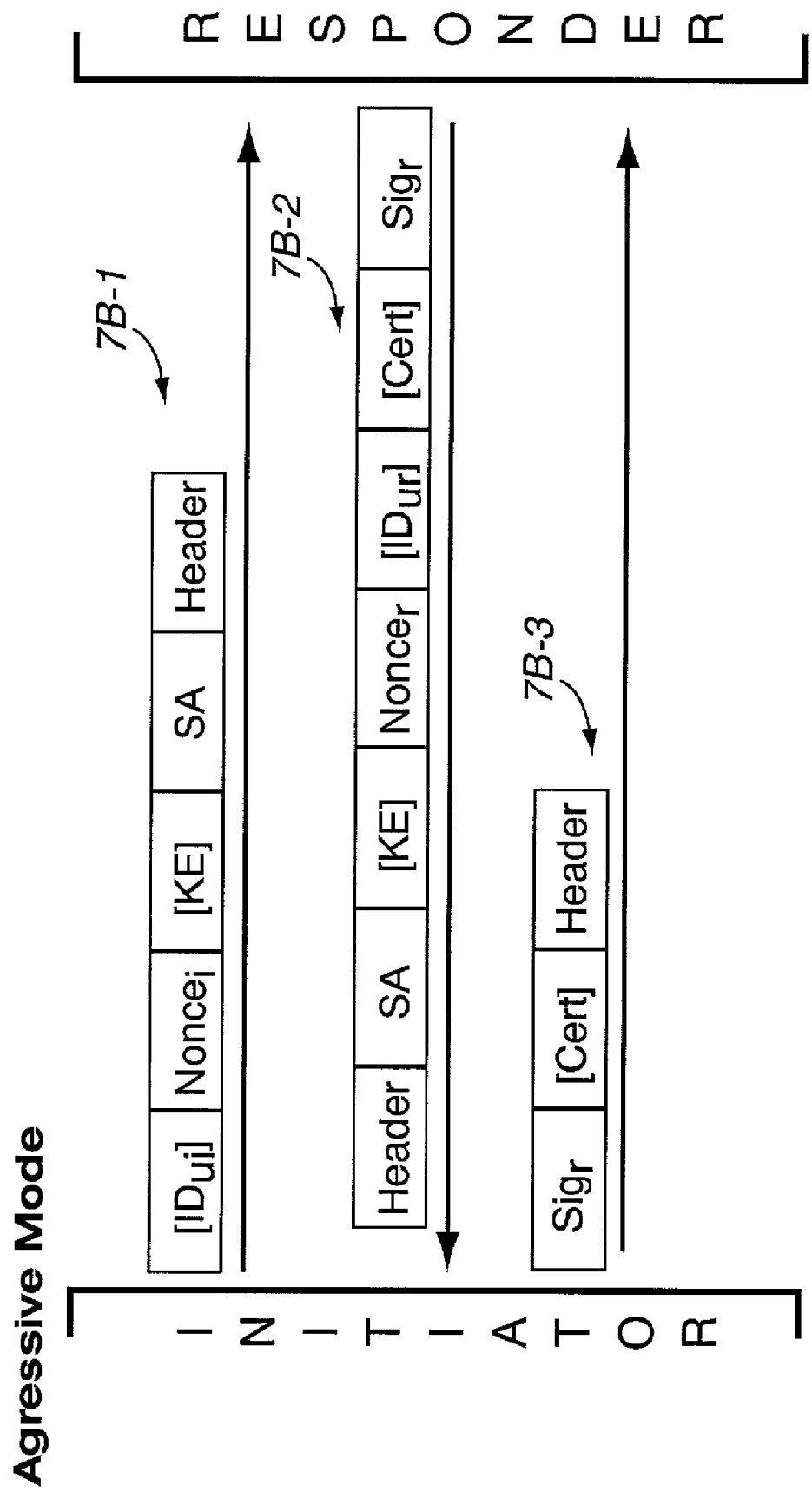

The Aggressive Mode of FIG. 7B resembles Main Mode, but fewer packet exchanges are needed. The first message 7B-1 proposes the security policy, passes data for the key exchange and passes the nonce for identification. The second message 7B-2 is a response that authenticates the responder and concludes the policy negotiation and key exchange. The last message 7B-3 is used to authenticate the initiator. Aggressive mode does not protect the identities of negotiators.

Figure 8A:
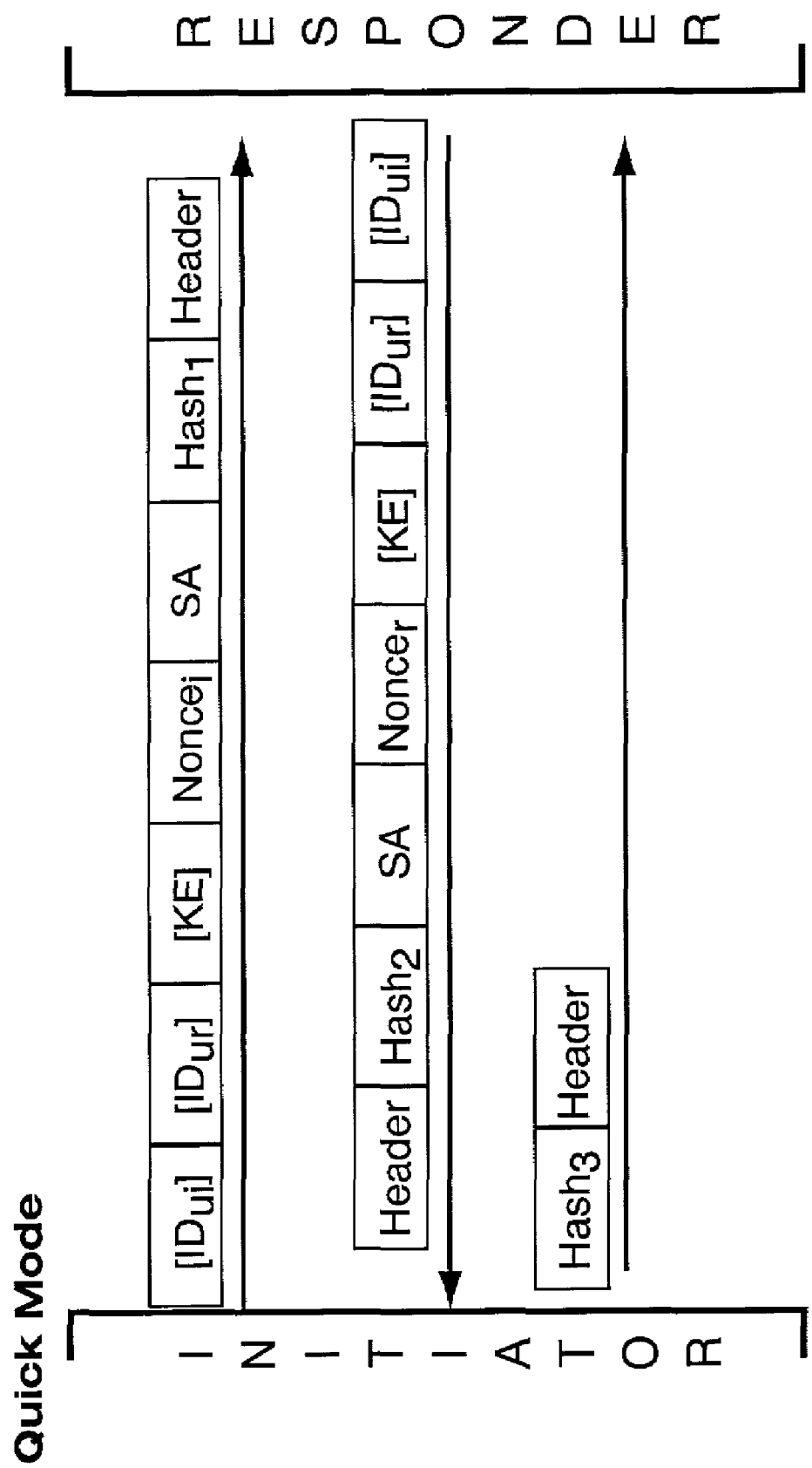
FIG. 8A, FIG. 8B, and FIG. 8C are diagrammatic views respectively showing a quick mode, a new group mode, and a IKE MAP mode of second phase security association.

The Quick Mode of FIG. 8A is used to negotiate IPsec security services and to generate new keying material. A full Diffie-Hellman key exchange can be done to provide perfect forward secrecy, although it is not mandated. If a Diffie-Hellman exchange is not needed, the parties can just generate a new key using hashes and identify each other by using nonces. If a Diffie-Hellman key exchange is needed, the new keying material is included in the exchange.

Figure 8B:
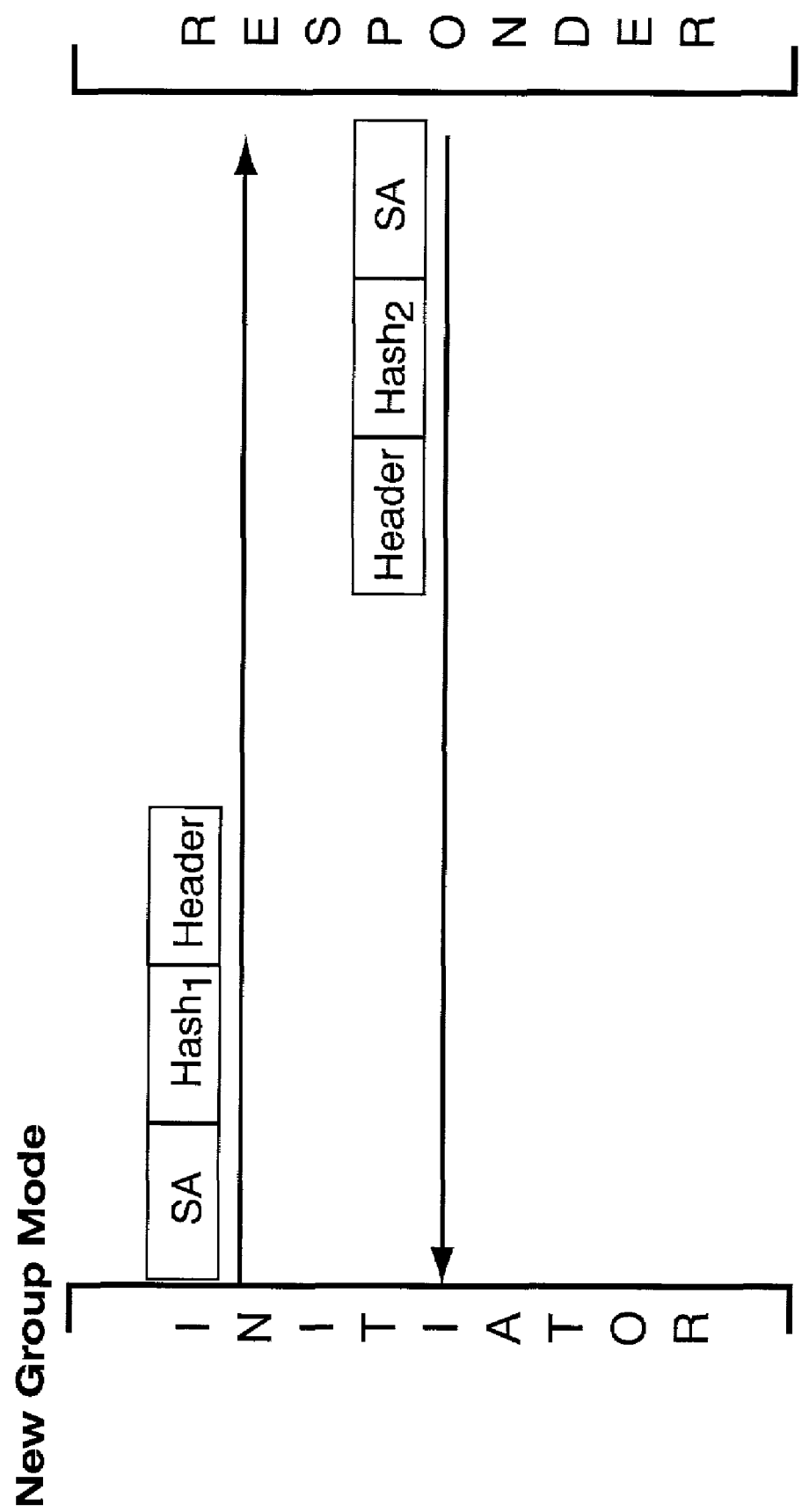

The New Group Mode of FIG. 8B is used to negotiate a new group (MODP or elliptic curve) where to do Diffie-Hellman exchange.

FIG. 7A is based on authentication by using signatures. The payloads are slightly different when other authentication methods are used. The main difference is that the signature is replaced by a has.

In FIG. 7A, FIG. 7B, FIG. 8A, and FIG. 8B, various abbreviations have been employed. "SA" refers to the negotiated security association. "Header" is an ISAKMP header corresponding to the used mode. "KE" is key exchange data for Diffie-Hellman key exchange. "Sig" is signature payload used for authentication. "Cert" is a certificate for the public key. "Nonce" is a random number sent for signing. "ID" is an identity payload. "[ ]" denotes an optional payload.

The functionality of IKE is not altered when IKE is extended to master MAP SA negotiation capabilities. A new Phase 2 (a new "quick mode") called MAP mode implements the new MAPSec functionality. Changes involved in the new quick mode are described below.

After the IKE MAP mode finishes, IKE returns the master MAP SA to IPE. IPE stores the negotiated master MAP SA to KAC-$Z_C$-SADB. Whenever key administration center (KAC) 44 notices that the soft limit of a master MAP SA is exceeded, the master MAP SA is refreshed according to the operator's policy that is described in KAC-$Z_A$-SPD as described herein.

In Phase 1 there is no changes to main mode, but it is currently preferred that only main mode be used under MAPSec DoI of ISAKMP.

Figure 8C:
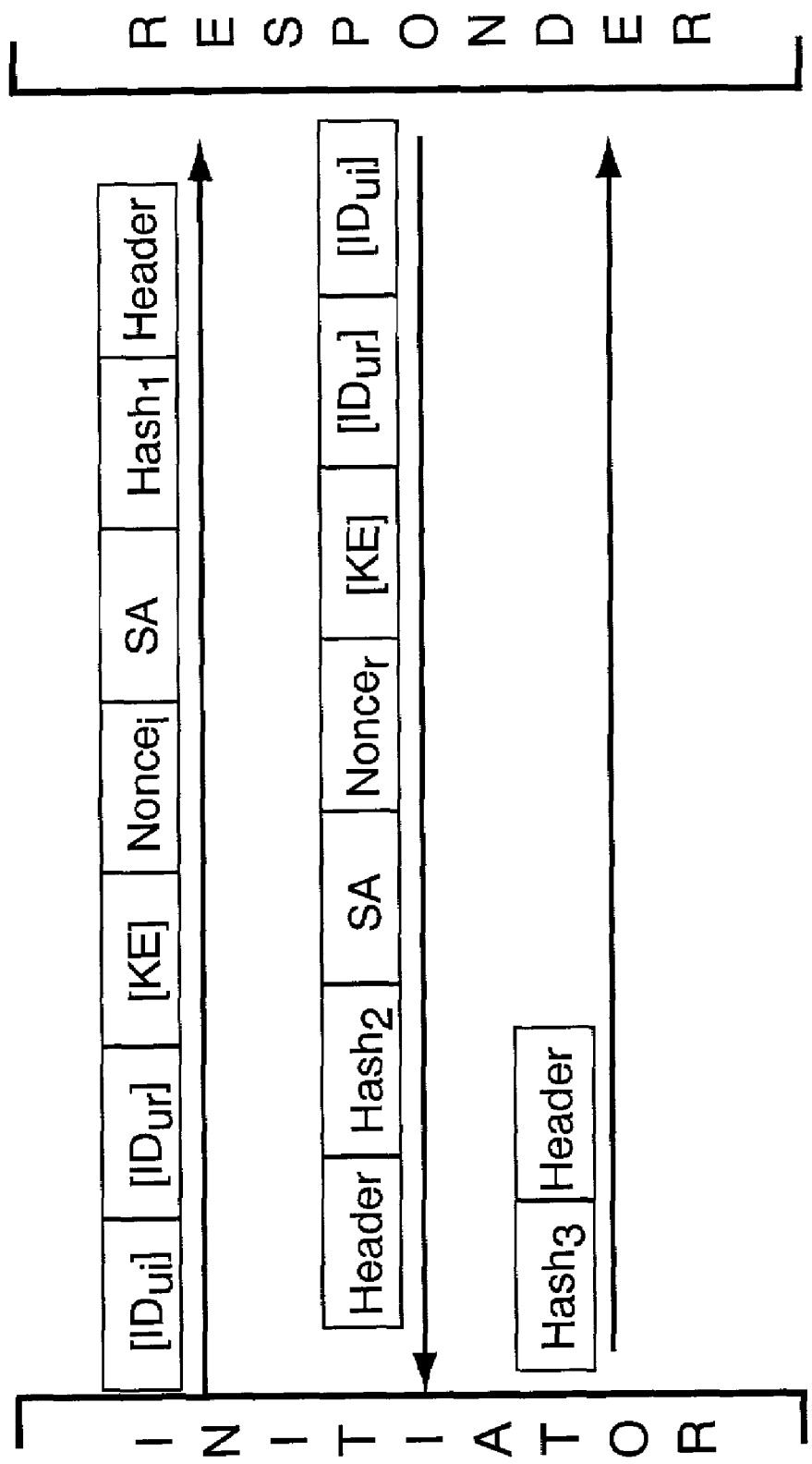

A new Phase 2 mode—the MAP mode—is introduced. The MAP mode, illustrated in FIG. 8C, differs from the existing IKE quick mode in the following respects: (1) payloads included to the messages of MAP mode are the same as in Quick Mode but the contents of the payloads differ in the case SA payload and ID payloads; (2) either the identity is never sent or if sent it will be the PLMDID in fqdn or der_gn encoded form (or the key_id); (3) KEYMAT for MAPSec SA template is as in the present Quick mode.

Mapsec Domain of Interpretation for ISAKMP

RFC2408: ISAKMP places the following significant requirements on a DoI definition: (1) Define the interpretation for the Situation field; (2) Define the set of applicable security policies; (3) Define the syntax for DoI-specific SA Attributes (Phase II); (4) Define the syntax for DoI-specific payload contents; (5) Define additional Key Exchange types, if necessary; (6) Define additional Notification Message types, if needed.

IANA will not normally assign a DoI value without referencing some public specification, such as an Internet RFC. Without a DoI value assigned by IANA, the MAP SA negotiation over the interface Za is not possible. MAPSec DoI for ISAKMP draft must be written, since the new DoI is an essential part of the key management architecture described herein.

Within ISAKMP, the MAPSec Situation Definition provides information that the responder can use to determine, how to process incoming SA request. For the MAPSec DoI, the Situation field is always left empty. The MAPSec DoI does not impose specific security policy requirements on any implementation.

The following list the Assigned Numbers for the MAPSec DoI: protocol identifiers and transform identifiers.

MAPSec Protocol Identifier defines a value for the Security Protocol Identifier referenced in an ISAKMP Proposal Payload for the MAPSec DoI. See Table 2. It is preferred that the chosen value should not overlap existing IPsec DoI values.

The MAPSec Transform Identifier defines one mandatory transform used to provide data confidentiality. See Table 3.

MAPSec Payload Content require inclusion of both the Security association payload and the Identification payload. MAPSec DoI does not introduce additional MAPSec Key Exchange Requirements Policies and Structure of KAC-$Z_A$-SPD Policies and Structure of KAC-$Z_A$-SPD are as described as in the RFC 2401 with following changes:

(1) The lifetime of the master MAP SA is not defined as an amount of data transferred, but as lifetime in seconds. The lifetime cannot be defined in amount of data transferred, since several NEs will use the same master MAP SA.

(2) The generated master MAP SA will not be used for processing inbound and outbound traffic in KACs and thus processing choices discard, bypass IPsec and apply IPsec are no applicable.

(3) The operator defines which networks the master MAP SAs are negotiated with.

The security policies for MAPSec key management are specified in the KACs' security policy database (SPD) by the network operator. The SPDs in the network elements are derived from the security policy database (SPD) of the key administration center (KAC) 44 in the network. There can be no local security policy definitions for individual network elements (NEs) 42.

The security policy database (SPD) can be implemented as a text file to ease the porting to different systems. Text-file based implementation is also easier to alter by possible third parties than a GUI interface. The security policy database (SPD) file contains the information required to implement the security policy and does not require a lot of memory. It can be easily cached to improve the performance of the system (real time requirements).

Storing Negotiated MAP SA

After internet key exchange functionality 44-1 has finished the negotiation of master MAP SA, the negotiated master MAP SA is returned to internet key exchange functionality 44-1. The internet key exchange functionality 44-1 will store the negotiated master MAP SA to KAC-$Z_C$-SADB database 44-7, from where all authorized network elements (NEs) 42 can obtain an appropriate master MAP SA. The internet key exchange functionality 44-1 always returns a DoI value with the negotiated SA. This DoI value can be used to identify the negotiated SA. If the DoI value returned by internet key exchange functionality 44-1 corresponds to IPsec DoI for ISAKMP, the negotiated SA is an IPsec SA. If the DoI value corresponds to MAPSec DoI for ISAKMP, the negotiated SA is a MAP SA. According to the DoI value, SAs will be stored in the correct SADB.

Figure 9:
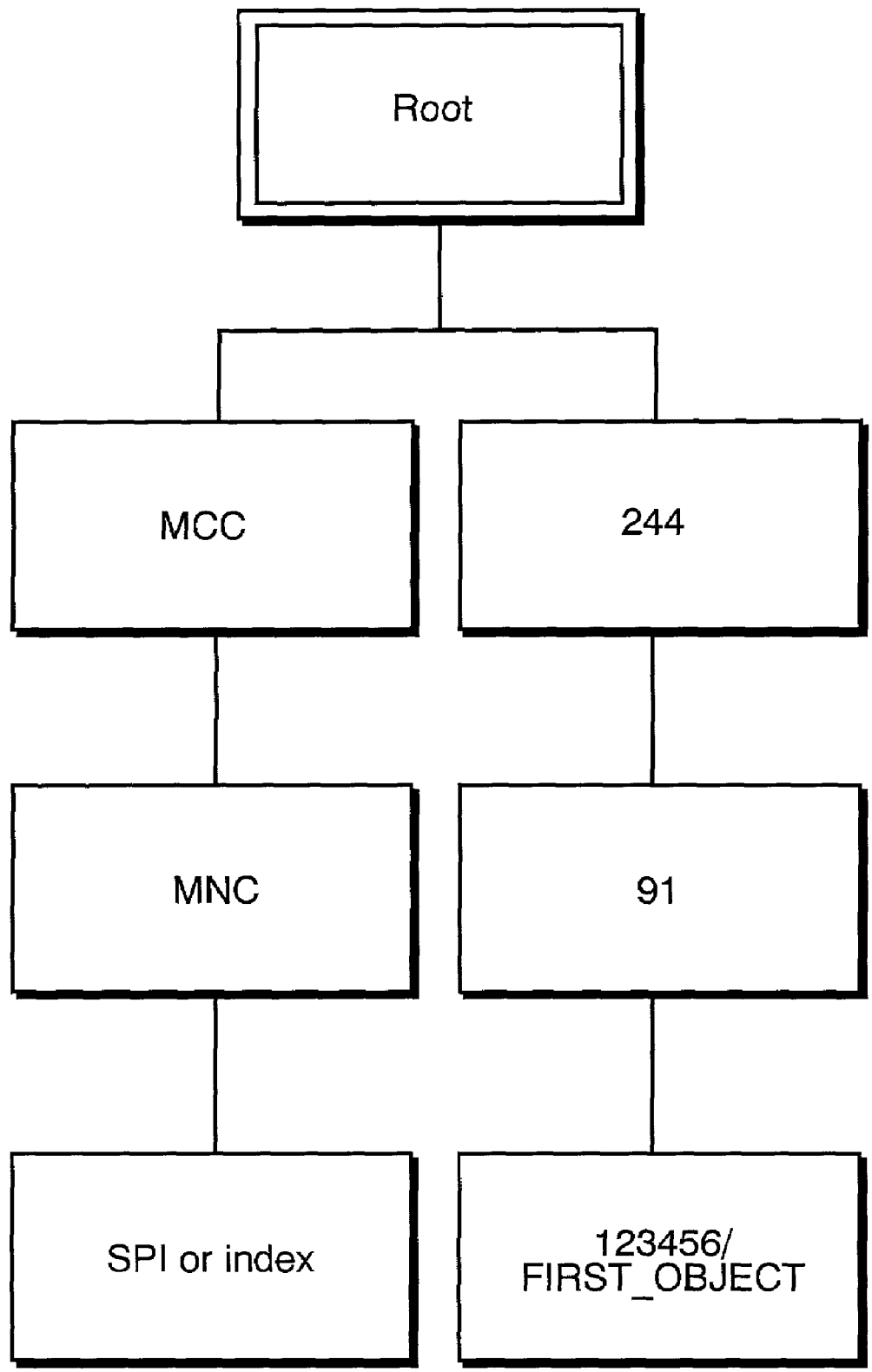
FIG. 9 is a diagrammatic view of example structure of a KAC-$Z_C$-SADB database.

After the key administration center (KAC) 44 has negotiated a master MAP SA pair, the key administration center (KAC) 44 stores the master MAP SAs in an HTTP server or an LDAP directory. Master MAP SAs must be stored in a way that they can be found using the remote network PLMNID and the SPI value of the master MAP SA. The structure of the KAC-$Z_C$-SADB database 44-7 that is currently preferred is illustrated in FIG. 9.

The key administration center (KAC) 44 must delete expired SAs from the server. When the lifetime of an SA ends or a soft limit of SA is reached (as defined in the operator's policy) the key administration center (KAC) 44 may negotiate a new master MAP SA with the destination network and insert it into the database (in which case it must delete the old SA). The network element (NE) 42 may keep the SA it has fetched and use it until the lifetime of that SA ends.

Distribution MAP SA Over Interface Zb

When a network element (NE) 42 needs to communicate with a foreign network element (NE) 42 in a different network, the initiating NE always needs to perform a query to KAC-$Z_C$-SADB database 44-7 to obtain a master MAP SA for the connection. The initiating 42 uses the destination network's PLMNID to identify the recipient network. The key administration center (KAC) 44 returns a master MAP SA negotiated with the network identified by the destination PLMNID. The query to KAC-$Z_C$-SADB database 44-7 is done using HTTP or LDAP.

If the initiating network element (NE) 42 gets a valid master MAP SA it can derive a connection specific MAP SA from the master and continue to secure the MAP traffic using this MAP SA.

When a responding network element (NE) 42 receives a protected MAP message, the responding network element (NE) 42 first performs a query to KAC-$Z_C$-SADB database 44-7 of its key administration center (KAC) 44 to obtain the corresponding master MAP SA. The master MAP SAs are identified using tuple <sending PLMNID, SPI>. After receiving the corresponding master MAP SA from the key administration center (KAC) 44, the responding key administration center (KAC) 44 derives the connection specific MAP SA from the master and can continue processing the received MAP messages.

If the responding NE's query for a matching master MAP SA is not responded with a correct master MAP SA that corresponds to the <sending PLMNID, SPI>, the responding NE must drop the received MAP message.

If the responding party is receiving secured MAP messages, but no MAP SAs exists for the corresponding Security Parameters Index (SPI), the MAP messages could be used, for example, to perform Denial of Service (DoS) attack against a network element (NE) 42 over the SS7 network.

If no master MAP SA exists for the requested network the NE must send "master MAP SA request" message to key administration center (KAC) 44. When the key administration center (KAC) 44 receives a "master MAP SA request", it must negotiate a new master MAP SA with the corresponding network and send "master MAP SA created response" message back to the network element (NE) 42.

All KAC-$Z_C$-SADB databases 44-7 mentioned above refer to the KAC-$Z_C$-SADB databases 44-7 of the home network of the network element (NE) 42 that originates the communication. It must not be possible to access the key administration center (KAC) 44 of a foreign network to obtain MAP SAs.

The network elements (NEs) 42 will need the master MAP SA from the key administration center (KAC) 44 to be able to connect to network elements (NEs) 42 in a separate network. When a network element (NE) 42 requires a SS7 connection to another network element (NE) 42, it will fetch a master MAP SA from the key administration center (KAC) 44. This is done with a query to the key administration center (KAC) 44. The query returns the master MAP SA to be used for securing the connection.

There are are two protocols that can be used for distributing the master MAP SAs from the KAC-$Z_C$-SADB database 44-7 to individual network elements. The first protocol is the Hypertext transfer protocol (HTTP), the second protocol is the Lightweight Directory Access Protocol (LDAP).

HTTP is a generic, stateless, object-oriented protocol that can be used for many tasks, such as name servers and distributed object management systems. In context of the key management architecture presented in this document HTTP can be used as the key distribution protocol between network elements (NEs) 42 and their KAC-$Z_C$-SADB databases 44-7. A feature of HTTP is the typing and negotiation of data representation, allowing systems to be built independently of the data being transferred. When HTTP is used as the protocol between KAC-$Z_C$-SADB database 44-7 and network elements (NEs) 42, the HTTP connection should be secured with the IPsec protocol. The secure HTTP connection between the KAC-$Z_C$-SADB database 44-7 and each network element (NE) 42 remains persistent if a valid IPsec SA exists for the connection at all times. Persistent connections improve the performance (the real time requirements) of data transfer by sharing a single IPsec SA between several HTTP requests. In practice the key administration center (KAC) 44 should run a HTTP server that the network elements (NEs) 42 can connect to retrieve the master MAP SAs from a standard HTTP database.

Lightweight Directory Access Protocol (LDAP) is a simple protocol used to access, modify and add data to and from a directory server. It allows basic searching, adding, modifying, and deleting operations. It does not provide real user authentication, but uses simple plain text name and password based authentication. Because of this, it is normally only used to search and retrieve data from the directory server. In this case, a network element (NE) 42 will only make searches to the directory. When using LDAP to fetch master MAP SA from the key administration center (KAC) 44 there will be a need for strong security between each key administration center (KAC) 44 and network element (NE) 42, which can be achieved by IPsec, IKE and certificates. Certificates provide a scalable and easy to maintain solution for authentication of the hosts involved.

It is currently preferred that the access method to be used for the distribution of master MAP SAs from the KAC to the network elements be HTTP. This is due to the simplicity and scalability of the solution. HTTP is a proven, well-known and thoroughly researched protocol. Different implementations for HTTP servers are readily available on the market today.

It is currently preferred that the MAP SA distribution method selected be protected with the IPsec protocol. Each NE has a certificate that is used for authenticating the host requesting information from the HTTP/LDAP server. IPsec is a very thorough and complete solution for the problems it tries to address, namely protecting IP traffic on the packet level. It can protect all traffic against unauthorized modification and eavesdropping, as well as securely authenticate the parties that are communicating with each other. It is an exact match for securing host-to-host communications such as the connection from network elements to the Key Administration Center.

It is currently preferred that the lifetime of IPsec SA between network element (NE) 42 and key administration center (KAC) 44 be relatively long in seconds but small in bytes to ensure maximal performance and security.

Table 4 list various abbreviations, terms, and acronyms employed herein.

In a first alternative embodiment, the Zb interface comprises running IPsec without IKE in order to (A) provide security for the transport of SAs from the key administration center (KAC) 44 to the network element (NE) 42; (B) requires no complete IKE implementation or computations from the network elements (NEs) 42.

In a second alternative embodiment, the Zb interface comprises the RSA encryption of the SAs sent by the key administration center (KAC) 44 to the network element (NE) 42. This enables each network element (NE) 42 to decrypt the messages using its own private key, while the key administration center (KAC) 44 uses the public key of the network element (NE) 42 to encrypt. Communication from the network element (NE) 42 back to the key administration center (KAC) 44 uses the public-private key pair of the key administration center (KAC) 44 in a similar fashion. This method avoids the use of IPSec and IKE altogether on the network elements (NEs) 42, and all security can be implemented solely on the application layer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

Summary of used protocols in each interface

| Interface | Protocol(s) | Explanation |
| --- | --- | --- |
| Za | IKE | IKE is used to negotiate the master MAP SA. MAP SA requires a new domain of interpretation for ISAKMP. |
| Zb | IKE IPsec HTTP | IKE is used to negotiate IPsec SA between KAC and NE. IPsec is used to secure the transfer of MAP SA. HTTP is used to fetch the MAP SAs from KAC-$Z_C$-SADB. |
| Zc | MAPSec | Master MAP SA negotiated through interface $Z_A$ is used to derive MAP SA that defines the security parameters used in MAPSec. |

TABLE 2

| Protocol ID | Value |
| --- | --- |
| PROTO_MAPSEC | 5 |

TABLE 3

| Transform ID | Value |
| --- | --- |
| RESERVED | 0 |
| MAPSEC_SHA1 | 1 |
| MAPSEC_TWOFISH | 2 |

TABLE 4

| Term or Acronym | Explanation |
| --- | --- |
| AES | Advanced Encryption Standard |
| AH | Authentication Header. An upper level header located between the IP header and a payload within an IP packet. The AH transformation is defined in RFC 2402. |
| CA | Certification Authority. An entity that attests to the identity of a person or an organization. A CA can be an external company that offers certificate services or it can be an internal organization such as a corporate Management Information System (MIS) department. The chief function of the CA is to verify the identity of entities and issue digital certificates attesting to that identity. |
| Diffie-Hellman | A method for key exchange between two parties. |
| DoI | Domain of Interpretation |
| DoS | Denial of Service |
| ESP | Encapsulating Security Payload. An upper level IP header that denotes that the contents of the payload are encrypted and possibly also otherwise protected. An ESP may also contain integrity protection. The ESP protocol is defined in RFC 2406. |

TABLE 4-continued

| Term or Acronym | Explanation |
|---|---|
| IANA | Internet Assigned Numbers Authority |
| IKE | Internet Key Exchange |
| IP | Internet Protocol |
| IPE | IPsec Policy Engine |
| IPsec | IP security protocol |
| ISAKMP | Internet Security Association and Key management Protocol |
| IV | Initialization vector. Initialization vectors are used with block ciphers in chained mode to force identical plaintext to encrypt to different cipher text. Usually random data to make each block unique by filling the cipher feedback registers. |
| KAC | Key Administration Center |
| KEYMAT | Keying material from master MAP SA. KEYMAT is derived as described in RFC 2409 The Internet Key Exchange (IKE). |
| LDAP | Lightweight Directory Access Protocol, as defined by RFC 2251, and RFC 1777. |
| MAP | Mobile Application Part (a part of the SS7 protocol stack) |
| MAPSec | MAP Security |
| MCC | Mobile Country Code |
| MNC | Mobile Network Code, a number to differentiate different networks within one country |
| NE | Network Element |
| $NE-Z_C$- SADB | A database maintained by each NE supporting MAPSec. The $NE-Z_C$-SADB contains the MAP SAs that are derived from the master MAP SAs. |
| PLMNID | Public Land Mobile Network ID |
| SA | Security Association. A unidirectional connection created for security purposes. All traffic traversing an SA is provided the same security processing. |
| SADB | Security Association Database |
| SHA-1 | The Secure Hash Algorithm (SHA), version one. The algorithm was designed by NSA (the U.S. National Security Agency), and is part of the U.S. Digital Signature Standard. This algorithm is considered very good. |
| SPD | Security Policy Database |
| SPI | Security Parameters Index. An arbitrary 32-bit number that is assigned to a SA. |
| SS7 | Signaling System no. 7 |
| TCP | Transmission Control Protocol |
| URI | Universal Resource Indicator |
| $Z_A$ | Interface between two KACs over an IP network |
| $Z_B$ | Interface between KAC and NE inside the operator's (presumably) IP network |
| $Z_C$ | Interface between two NEs over SS7 network |

What is claimed is:

1. A method of sending a mobile application part (MAP) protocol message between a first network element of a first telecommunications network and a second network element of a second telecommunications network, the method comprising:

between a key administration center of the first telecommunications network and a key administration center of the second telecommunications network, using Internet Key Exchange (IRE) to negotiate a master security association between the first telecommunications network and the second telecommunications network, the master security association comprising a set of security parameters;

using the master security association to derive a unique connection-specific security association for use by the first network element on a connection between the first network element and the second network element;

at the first network element, including a parameter obtained from the connection-specific security association in an encrypted/authenticated MAP message sent from the first network element to the second network element;

at the second network element, upon receipt of the MAP message using the master security association to derive a connection-specific security association for use by the second network element;

using the connection-specific security association for use by the second network element to decrypt/decode the MAP message;

performing negotiating of the master security association between the first telecommunications network and the second telecommunications network over a first intermediate network which differs from a second intermediate network over which the MAP message is sent, wherein the first intermediate network and the second intermediate network interconnect the first telecommunications network and the second telecommunications network.

2. The method of claim 1, further comprising performing negotiating of the master security association between the first telecommunications network and the second telecommunications network over a network which differs from a network over which the MAP message is sent.

3. The method of claim 2, further comprising performing negotiating of the master security association between the first telecommunications network and the second telecommunications network over an Internet Protocol network.

4. The method of claim 2, further comprising sending the MAP message over a Signaling System No. 7 network.

5. The method of claim 1, wherein the master security association is a set of security parameters that includes at least one of the following:
    (1) an authentication algorithm;
    (2) authentication keying material;
    (3) an encryption algorithm;
    (4) encryption keying material;
    (5) a lifetime value for the master security association.

6. The method of claim 1, wherein the master security association includes at least one of the following:
    (1) an authentication algorithm;
    (2) authentication keying material;
    (3) an encryption algorithm;
    (4) encryption keying material;
    (5) a lifetime value for the master security association.

7. The method of claim 1, wherein the connection-specific security association is a set of security parameters that specifies a cryptographic key used in communication between the first network element and the second network element.

8. The method of claim 1, further comprising at least one of the following:
    the first network element requesting the master security association from a key administration center of the first telecommunications network;
    the second network element requesting the master security association from a key administration center of the second telecommunications network.

9. The method of claim 8, wherein at least one of the requesting actions is implementing utilizing an Internet Protocol.

10. The method of claim 1, wherein the parameter included in the MAP message comprises security information that is required in order to extract protected information from the MAP message.

11. The method of claim 10, further comprising including a Security Parameters Index (SPI) in the MAP message.

12. The method of claim 11, further comprising including the Security Parameters Index (SPI) in a MAP Security Header in the MAP message.

13. The method of claim 10, further comprising including in the MAP message along with the parameter a sending network identifier, and wherein the parameter in conjunction with the sending network identifier identifies a master security association.

14. The method of claim 1, wherein the parameter comprises a combination of an arbitrary value and a sending network identifier, the combination uniquely identifying the master security association. association.

15. The method of claim 14, wherein the sending network identifier is a PLMNID value, the PLMNID value being formed from the Mobile Country Code (MCC) and Mobile Network Code (MNC).

16. A telecommunications system comprising a first telecommunications network and a second telecommunications network, the system comprising:
 a first key administration center at the first telecommunications network and a second key administration center at the second telecommunications network which negotiate a master security association using Internet Key Exchange (IRE), the master security associating comprising a set of security parameters;
 a first network element of the first telecommunications network which uses the master security association to derive a unique connection-specific security association for use by the first network element on a connection between the first network element and the second network element and which includes a parameter obtained from the connection-specific security association in an encrypted/authenticated MAP message sent from the first network element to the second network element;
 a second network element belonging to the second telecommunications network, the second network element being configured, upon receipt of the MAP message, to use the master security association to derive a connection-specific security association for the second network element and to use the connection-specific security association for the second network element to decrypt/decode the MAP message;
 performing negotiating of the master security association between the first telecommunications network and the second telecommunications network over
 a first intermediate network for interconnecting the first telecommunications network and the second telecommunications network and over which the master security association is negotiated;
 a second intermediate network, which differs from the intermediate network, for interconnecting the first telecommmunications network and the second telecommunications network and over which the MAP message is sent.

17. The system of claim 16, wherein the first key administration center and the second key administration center negotiate the master security association over a network which differs from a network over which the MAP message is sent.

18. The system of claim 16, wherein the first key administration center and the second key administration center negotiate the master security association over an Internet Protocol network.

19. The system of claim 16, further comprising a Signaling System No. 7 network over which the MAP message is sent.

20. The system of claim 16, wherein the master security association is a set of security parameters that includes at least one of the following:
 (1) an authentication algorithm;
 (2) authentication keying material;
 (3) an encryption algorithm;
 (4) encryption keying material;
 (5) a lifetime value for the master security association.

21. The system of claim 16, wherein the connection-specific security association is a set of security parameters that specifies a cryptographic key used in communication between the first network element and the second network element.

22. The system of claim 16, wherein the first network element requests the master security association from a key administration center of the first telecommunications network using an Internet Protocol.

23. The system of claim 16, wherein the second network element requests the master security association from a key administration center of the second telecommunications network.

24. The system of claim 23, wherein the second network element requests the master security association from a key administration center of the second telecommunications network using an Internet Protocol.

25. The system of claim 16, wherein the parameter included in the MAP message comprises security information that is required in order to extract protected information from the MAP message.

26. The system of claim 25, wherein a Security Parameters Index (SPI) is included in the MAP message.

27. The system of claim 26, wherein the Security Parameters Index (SPI) is included in a MAP Security Header in the MAP message.

28. The system of claim 16, further comprising a sending network identifier included in the MAP message along with the parameter; and wherein the parameter in conjunction with the sending network identifier identifies a master security association.

29. The system of claim 16, wherein the parameter comprises a combination of an arbitrary value and a sending network identifier, the combination uniquely identifying the master security association.

30. The system of claim 29, wherein the sending network identifier is a PLMNID value, the PLMNID value being formed from the Mobile Country Code (MCC) and Mobile Network Code (MNC).

* * * * *

UNITED STATES PATENT AND TRADEMARK OFFICE
CERTIFICATE OF CORRECTION

PATENT NO. : 7,181,012 B2 Page 1 of 1
APPLICATION NO. : 09/948101
DATED : February 20, 2007
INVENTOR(S) : Arkko et al.

It is certified that error appears in the above-identified patent and that said Letters Patent is hereby corrected as shown below:

On the Title Page, item (51), under "Int. Cl.", in Column 1, Line 2, below "H04N 1/44" delete "HO4N 1/00    (2006.01)".

In Column 17, Line 57, in Claim 1, delete "(IRE)" and insert -- (IKE) --, therefor.

In Column 19, Line 12, in Claim 14, after "security" delete "association.".

In Column 19, Line 24, in Claim 16, delete "(IRE)" and insert -- (IKE) --, therefor.

Signed and Sealed this

Twenty-ninth Day of April, 2008

JON W. DUDAS
*Director of the United States Patent and Trademark Office*